L. O. JOHNSONBAUGH.
AIR BRAKE EMERGENCY VALVE.
APPLICATION FILED JAN. 31, 1910.
1,001,040.
Patented Aug. 22, 1911.
2 SHEETS—SHEET 1.
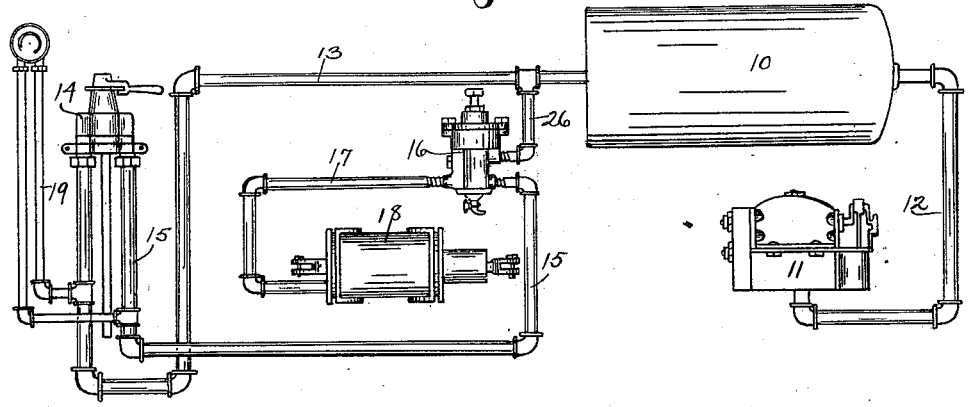
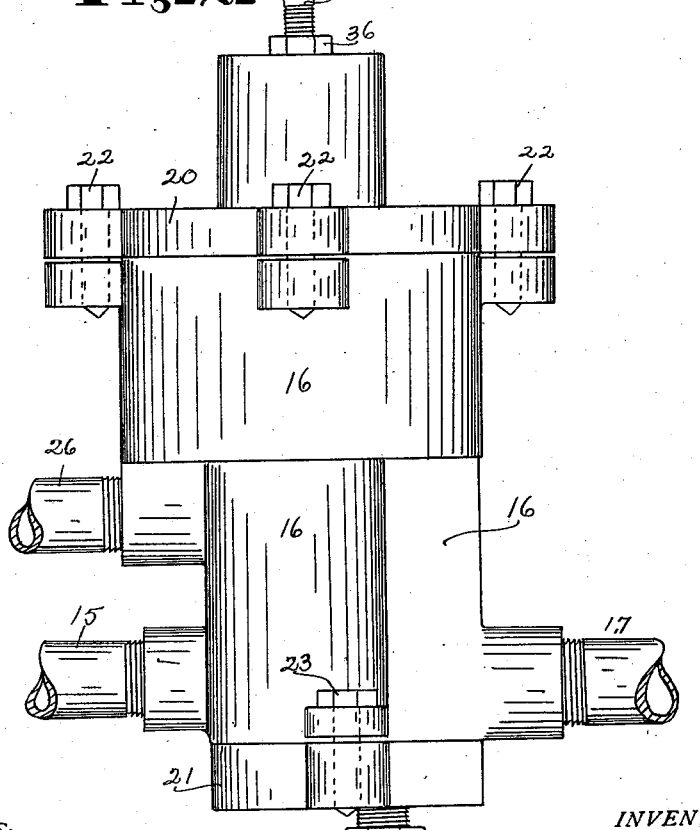
WITNESSES:
INVENTOR.
Lee O. Johnsonbaugh
BY
ATTORNEY.

L. O. JOHNSONBAUGH.
AIR BRAKE EMERGENCY VALVE.
APPLICATION FILED JAN. 31, 1910.
1,001,040.
Patented Aug. 22, 1911.
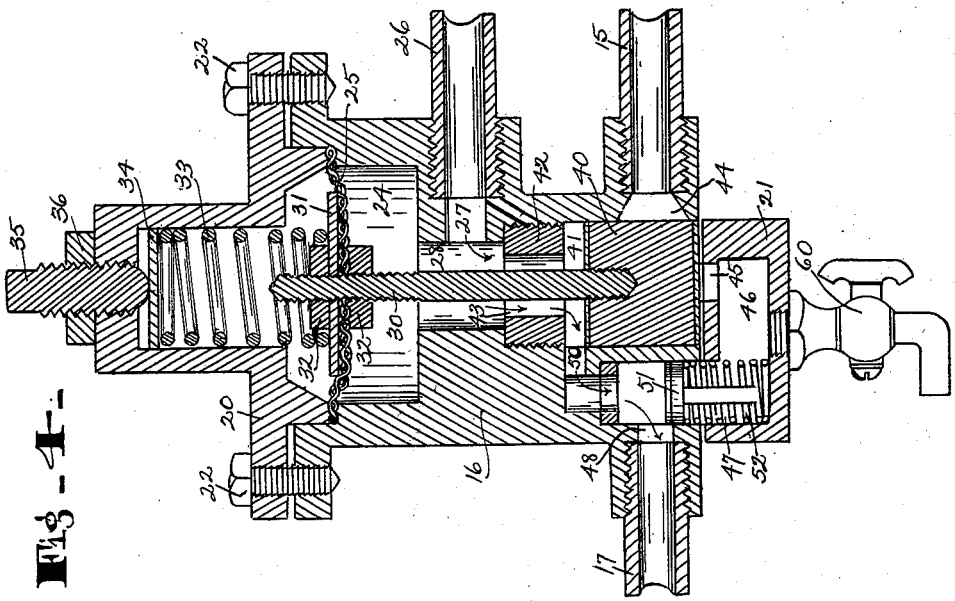
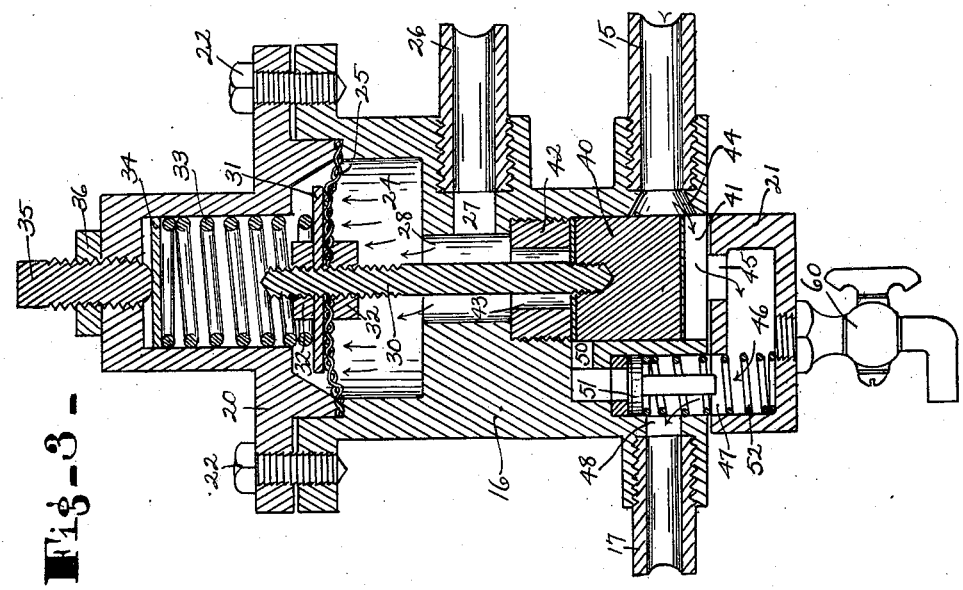
WITNESSES:
INVENTOR.
Lee O. Johnsonbaugh
BY
ATTORNEY.

UNITED STATES PATENT OFFICE.

LEE O. JOHNSONBAUGH, OF LEBANON, INDIANA, ASSIGNOR OF ONE-HALF TO HENRY K. JOHNSONBAUGH, OF MUNCIE, INDIANA.

AIR-BRAKE EMERGENCY-VALVE.

1,001,040.

Specification of Letters Patent.   Patented Aug. 22, 1911.

Application filed January 31, 1910.  Serial No. 541,191.

*To all whom it may concern:*

Be it known that I, LEE O. JOHNSONBAUGH, of Lebanon, county of Boone, and State of Indiana, have invented a certain new and useful Air-Brake Emergency-Valve; and I do hereby declare that the following is a full, clear, and exact description thereof, reference being had to the accompanying drawings.

The object of this invention is to provide automatic means for setting the brakes of a street car or the like when the direct air brake system on the car has without the knowledge of the motorman become defective. Heretofore frequently the direct air brake system in a car has become defective without the motorman's knowledge, and when approaching a down grade or bend, or other dangerous place, he has been unable to set his brakes and accidents have resulted. In accomplishing said object an emergency valve is employed which is located between and in communication with the reservoir and brake cylinder and between and in communication with the motorman's controlling mechanism and the brake cylinder, whereby when the pressure is high and said emergency valve mechanism is in the normal condition, there is a direct communication between the motorman's controlling mechanism and the brake cylinder, but when the air pressure in the reservoir is too low and the emergency valve mechanism is in its abnormal condition, the communication above referred to is terminated and communication between the reservoir and brake cylinder is established automatically.

The nature of the invention will be understood from the accompanying drawings and the following description and claims.

In the drawings Figure 1 is a diagrammatic view, with parts in elevation and parts in plan, of an air brake system with said emergency valve connection in place therein. Fig. 2 is an elevation of the emergency valve mechanism with the connections broken away. Fig. 3 is a central vertical section through the emergency valve mechanism while the parts are in their normal positions. Fig. 4 is the same while the parts are in the abnormal and automatic braking condition.

In the drawings 10 represents a reservoir into which air is compressed by the pump 11 and entering through the pipe 12. From the reservoir the compressed air normally passes through pipe 13 to the motorman's controlling mechanism 14. A pipe 15 extends from said motorman's controlling mechanism to the emergency valve mechanism 16, and a pipe 17 extends from the emergency valve mechanism to the air brake cylinder 18. The other mechanism required in an air brake system is not here shown, as the same forms no particular part of this invention, but there is shown a gage apparatus 19 at the front end of the system, as seen in Fig. 1.

Referring to Fig. 3, the emergency valve mechanism 16 consists of a main portion or casing with an upper end portion 20 and a lower end portion 21 removably secured thereto by screw bolts 22 and 23. In the upper portion of the casing there is a diaphragm chamber 24 in which a diaphragm 25 is mounted. It is a disk and, as herein shown, consists of strong canvas or like fabric through which air cannot pass, and its peripheral edge is clamped between the parts 16 and 20, so that the intermediate portion may be forced upwardly under normal conditions by the normal pressure of air in the reservoir 10 coming through the pipe 26. From this pipe 26 there is a port 27 entering a chamber 28 that is just below and in communication with the chamber 24.

There is a valve stem 30 connected with the diaphragm 25, it being threaded and having a plate 31 on the upper side and a pair of nuts 32 clamping the plate and diaphragm together. In the upper portion 20 there is a chamber containing a spiral spring 33 that bears down on the plate 31, and a plate 34 lies on top of said spring and is pushed downwardly by a set screw 35 which is locked in place by a nut 36. The feature of this part of the construction is that the tension of the spring 33 may be so adjusted that it will yield, as indicated in Fig. 3, under the influence of the compressed air when the pressure is normal, say 70 pounds per square inch in the reservoir. But if the pressure of the air in the reservoir becomes below normal, say 60 pounds per square inch, then the spring 33 will overcome the resistance of the air below the diaphragm 25 and force it down from the position shown in Fig. 3 to that shown in Fig. 4. At the lower end of the valve stem 30 there is a piston-like valve 40 secured, operating in a chamber 41, which is somewhat longer than the valve and which lies between a stop nut 42 above and the portion or member 21 below. The stop nut 42 has an enlarged central opening 43 through it that is of greater diameter than the valve stem. This valve 40 is for the purpose of opening and closing the port 44 at the end of the pipe 15 as it enters the emergency valve mechanism. When the valve 40 is in its upper and normal position, as shown in Fig. 3, air can pass from pipe 15 through port 44 into the lower end of the chamber 41 and out through port 45 in the portion 21 into chamber 46 therein and through the spring chamber 47 and through port 48 to the pipe 17. This is the normal path of the compressed air to the brake cylinder 18; that is, the compressed air passes normally from the tank through pipe 13 and to the controlling mechanism 14 back through pipe 15 and the lower part of the emergency valve and pipe 17 to the brake cylinder 18. When, however, the controlling mechanism 14 is operated in the well known manner so as to shut off the communication between pipes 13 and 15, it permits the exhausting of air from the brake cylinder and releases the brake. The details of the controlling mechanism 14 for accomplishing this function are not shown, as there is nothing novel in it. When, however, the pressure in the reservoir 10 gets too low, the diaphragm is pushed down, as shown in Fig. 4, and the valve 40 will close the port 44 and shut off the pipe 15 from the motorman's control 14, and then the compressed air will come through from the reservoir 10 through pipe 26, port 27, chamber 28, passageway 43 in the upper part of chamber 41, and through a port 50 leading to chamber 47, and through port 48 to the pipe 17 and the brake cylinder. This will set the brakes, as the tension of the spring 33 is such as to actuate the mechanism in the emergency valve structure as soon as the pressure passes below normal and is still high enough to set the brakes. The port 50 is closed at the lower end by a valve 51 and the spring 52 acting upwardly against it when the air is passing from pipe 15 through the lower part of the emergency valve mechanism to pipe 17, and the upper end of the port 50 is closed by valve 40. But when the valve 40 descends and shuts off the air coming in through pipe 15 and opens port 50 at the upper end and lets in air under pressure from the reservoir, that air will push the valve 51 from the position shown in Fig. 3 down in the position shown in Fig. 4, so that the air can pass through pipe 17. The nut 42 can be adjusted so as to limit the upward movement of the valve 40 as desired. Therefore, if the pump has become defective, or for any reason the air pressure in tank 10 becomes so low that it cannot resist the action of the spring 33, said spring will operate the valve mechanism, as shown in Fig. 4, and the brakes will be set automatically and the car stopped before any danger arises. That will notify the motorman of the defective condition of his air brake system. He then can step off the car and release the brakes arising from this automatic emergency valve mechanism by opening the valve 60, which is in the nature of a pet cock at the lower end of the member 21 of the emergency valve mechanism and is in communication with the chamber 46.

By "direct air brake system" as used herein is meant one in which the brake is set by the pressure of the compressed air or other gas.

What I claim as my invention and desire to secure by Letters Patent is:

1. The combination with a direct air brake system including a compressed air reservoir, a brake cylinder, a controlling mechanism, and air communication from the reservoir through the controlling mechanism to the brake cylinder, of an emergency valve mechanism having a casing with one end thereof interposed in the communication between the controlling mechanism and the brake cylinder, a communication through said casing between the reservoir and the brake cylinder, a piston-like valve in said casing which in one position opens one of said communications to the brake cylinder and closes the other and in another position closes said first-mentioned communication and opens the latter, and means actuated by the pressure of the air from the reservoir for holding said valve in position to open the communication between the controlling mechanism and the brake cylinder and which means moves said valve to its other position when the air in the reservoir is below a predetermined pressure.

2. The combination with a direct air brake system including a compressed air reservoir, a brake cylinder, a controlling mechanism, and air communication from the reservoir through the controlling mechanism to the brake cylinder, of an emergency valve mechanism having a casing with one end thereof interposed in the communication between the controlling mechanism and the brake cylinder, and the other end having a diaphragm chamber, a communication between said diaphragm chamber and the reservoir, a diaphragm in said chamber against which the air from the reservoir acts, an adjustable spring acting on said diaphragm against the action of the air in the reservoir, communication between the reservoir and the brake cylinder through said casing, and a valve movable by said diaphragm for opening and closing the communications to the brake cylinder.

3. The combination with a direct air brake system including a compressed air reservoir, a brake cylinder, a controlling mechanism, and air communication from the reservoir through the controlling mechanism to the brake cylinder, of an emergency valve mechanism having a casing with one end thereof interposed in the communication between the controlling mechanism and the brake cylinder, and the other end having a diaphragm chamber, a communication between said diaphragm chamber and the reservoir, a diaphragm in said chamber against which the air from the reservoir acts, an adjustable spring acting on said diaphragm against the action of the air in the reservoir, communication between the reservoir and the brake cylinder through said casing, a valve movable by said diaphragm for opening and closing the communications to the brake cylinder, and a spring-held valve in said casing for closing the passageway therethrough between the reservoir and the brake cylinder and which opens against the action of air when it comes from said reservoir.

4. The combination with a direct air brake system including a compressed air reservoir, a brake cylinder, a controlling mechanism, and air communication from the reservoir through the controlling mechanism to the brake cylinder, of an emergency valve mechanism having a casing interposed in the communication between the controlling mechanism and the brake cylinder, a communication through said emergency valve casing between the reservoir and the brake cylinder, valve means in said casing adapted to close the communication between the controlling mechanism and the brake cylinder and to establish the communication between the reservoir and the brake cylinder, and a valve closed outlet from said emergency valve mechanism to the open air.

In witness whereof, I have hereunto affixed my signature in the presence of the witnesses herein named.

LEE O. JOHNSONBAUGH.

Witnesses:
G. H. BOINK,
O. M. MCLAUGHLIN.

Copies of this patent may be obtained for five cents each, by addressing the "Commissioner of Patents, Washington, D. C."